(12) United States Patent
Wayne et al.

(10) Patent No.: US 10,627,341 B1
(45) Date of Patent: Apr. 21, 2020

(54) OPTICAL INTERROGATOR FOR MEASURING POLARIZATION PROPERTIES

(71) Applicant: United States of America as respresented by the Secretary of the Navy, San Diego, CA (US)

(72) Inventors: David Thomas Wayne, San Diego, CA (US); Burton Hamilton Neuner, III, San Diego, CA (US); Peter Poirier, San Diego, CA (US); Michael Garrett Lovern, Chula Vista, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 0 days.

(21) Appl. No.: 16/284,577

(22) Filed: Feb. 25, 2019

(51) Int. Cl.
    *G01N 21/21*      (2006.01)

(52) U.S. Cl.
    CPC ....... *G01N 21/21* (2013.01); *G01N 2021/216* (2013.01); *G01N 2201/0636* (2013.01);
(Continued)

(58) Field of Classification Search
    CPC .. G01N 21/255; G01N 21/45; G01N 21/7746; G01N 1/38; G01N 1/4077; G01N 2021/458; G01N 2021/4735; G01N 2021/7776; G01N 2021/7779; G01N 21/01; G01N 21/359; G01N 21/39; G01N 21/47; G01N 21/4795; G01N 21/55; G01N 21/6428; G01N 21/648; G01N 21/65; G01N 21/76; G01N 21/7703; G01N 21/78; G01N 2291/02827; G01N 2291/2634; G01N 25/22; G01N 25/28; G01N 27/16;
(Continued)

(56) References Cited

U.S. PATENT DOCUMENTS 5,965,874 A * 10/1999 Aso ................... G01J 4/00 250/225
7,519,096 B2 * 4/2009 Bouma ................ A61B 5/0066 372/102

(Continued)

OTHER PUBLICATIONS

Berry, H. G., "Measurement of the Stokes parameters of light." Applied Optics vol. 18, No. 12, 1977.
(Continued)

*Primary Examiner* — Michael P Stafira
(74) *Attorney, Agent, or Firm* — Naval Information Warfare Center, Pacific; Kyle Eppele; J. Eric Anderson (57) ABSTRACT

An optical interrogator for illuminating an object comprising a laser, a splitter, an optical polarizing element, and an optical recombiner. The laser is configured to generate a laser pulse, which the splitter splits into first, second, third, fourth, fifth, and sixth laser segments such that each of the laser segments are separated by a time delay on the order of nanoseconds between each laser segment. The optical polarizing element is positioned so as to respectively polarize the first, second, third, fourth, fifth, and sixth laser segments with a 0° linear polarization, a 45° linear polarization, a 90° linear polarization, a 135° linear polarization, a right-handed, circular polarization (RHCP), and a left-handed, circular polarization (LHCP). The optical recombiner combines the polarized laser segments into a train of co-aligned pulses for illuminating the object.

20 Claims, 5 Drawing Sheets

(52) U.S. Cl.
CPC ............... *G01N 2201/0683* (2013.01); *G01N 2201/0697* (2013.01)

(58) Field of Classification Search
CPC ...... G01N 27/18; G01N 27/407; G01N 29/00; G01N 29/024; G01N 29/14; G01N 29/223; G01N 29/2418; G01N 33/0037; G01N 33/0047; G01N 33/0054; G01N 33/14; G01N 33/42
See application file for complete search history.

(56) References Cited

U.S. PATENT DOCUMENTS

| | | | | |
|---|---|---|---|---|
| 2007/0165234 | A1* | 7/2007 | Podoleanu | A61B 3/102 356/451 |
| 2015/0219497 | A1* | 8/2015 | Johs | G01J 4/02 356/367 |
| 2017/0075064 | A1* | 3/2017 | Docter | G01D 5/35316 |

OTHER PUBLICATIONS

Poirier, P., "Active Polarimeter for Target Recognition Final Report," SSC Pacific Technical Document 3197, 2005.

Poirier, P., "Appendix B, Mueller Matrix Measurements, Active Polarimeter for Target Recognition Final Report," SSC Pacific Technical Document 3197, 2005.

\* cited by examiner

OPTICAL INTERROGATOR FOR MEASURING POLARIZATION PROPERTIES

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 104085.

BACKGROUND OF THE INVENTION

The polarization of a beam of light can be completely described by four parameters. Polarization properties of an object can be completely captured by the Stokes parameters. Generally speaking, light is partially elliptically polarized, and therefore is composed of a combination of linear and circular polarizations. The Stokes parameters decompose the polarization of light into four vectors. The relationship between the Stokes parameter of light incident on and reflected off an object can be quantified by the sixteen Mueller matrix elements. These Mueller matrix elements determine the polarization properties of an object.

An object can be classified according to its reflected polarization. Traditional techniques for measuring an object's unique polarization signature involve individual measurements of reflected Stokes parameters for a given set of generated Stokes parameters illuminating the object. These techniques are often done with discrete measurements, such as illuminating an object with a known polarization and measuring the polarization properties of the reflection. After a measurement is made with the first generated polarization, a second polarization is used to illuminate the object and the reflection is measured. This continues until the Stokes vectors are generated and measured then the Mueller matrix element measurements are complete. Challenges with existing methods and devices for characterizing an object's polarization include:
1. Sequential measurements can be time-consuming.
2. If the object being measured is in a dynamic environment, such as outside in the atmosphere, or underwater, the medium through which the light propagates can change during the sequential measurements.
3. Sequential measurements assume the object remains in the same pose or geometric orientation during the polarization measurements, which is not the case for moving objects.
4. Calibration is required for the source of each polarization state used to interrogate the object under test.
5. An absolute measurement is required for the interrogating polarization source, so the outgoing optical power must be measured for each.

Accordingly, there is a need for an improved method and device for characterizing the polarization properties of an object.

SUMMARY

Disclosed herein is an optical interrogator for illuminating an object comprising a laser, a splitter, an optical polarizing element, and an optical recombiner. The laser is configured to generate a laser pulse, which the splitter is positioned to receive. The splitter is configured to split the laser pulse into first, second, third, fourth, fifth, and sixth laser segments such that each of the laser segments are separated by a time delay on the order of nanoseconds between each laser segment. The optical polarizing element is positioned so as to respectively polarize the first, second, third, fourth, fifth, and sixth laser segments with a 0° linear polarization, a 45° linear polarization, a 90° linear polarization, a 135° linear polarization, a right-handed, circular polarization (RHCP), and a left-handed, circular polarization (LHCP). The optical recombiner is positioned to receive the polarized laser segments and configured to combine the polarized laser segments into a train of co-aligned pulses for illuminating the object.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed apparatus and method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
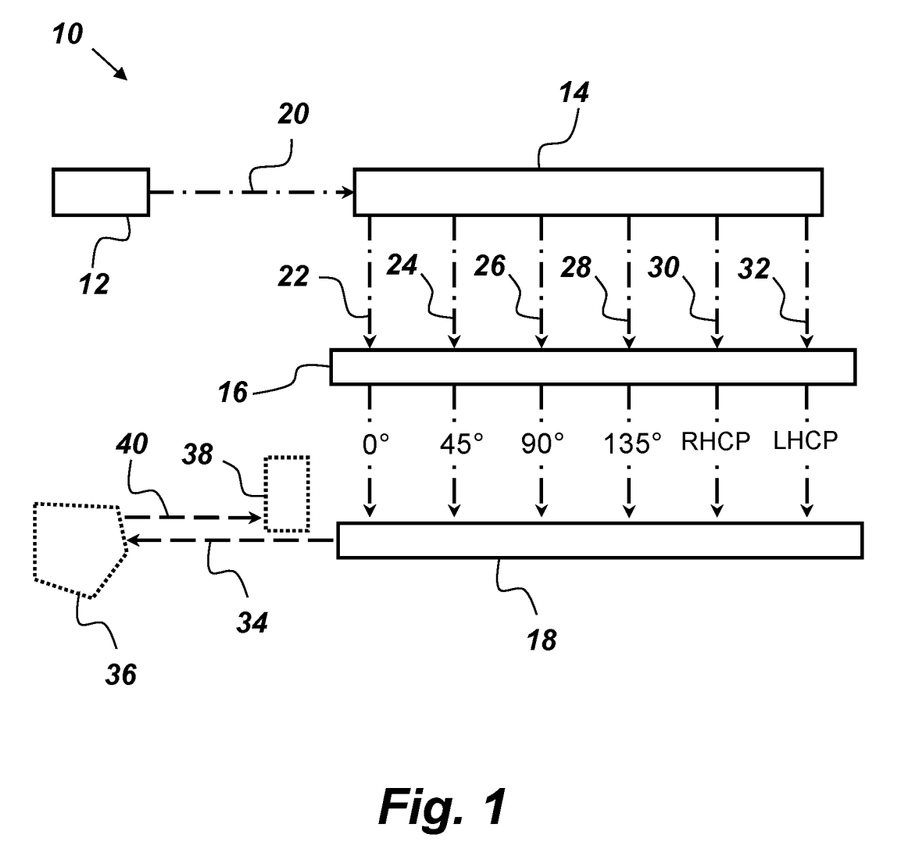
FIG. 1 is an illustration of an optical interrogator.

FIG. 1 is an illustration of an optical interrogator 10 that comprises, consists of, or consists essentially of a laser 12, a splitter 14, an optical polarizing element 16, and an optical recombiner 18. The laser 12 is configured to generate a laser pulse 20, which the splitter 14 is positioned to receive. The splitter 14 is configured to split the laser pulse 20 into first, second, third, fourth, fifth, and sixth laser segments 22, 24, 26, 28, 30, and 32 respectively. Each of the laser segments 22, 24, 26, 28, 30, and 32 are separated by a time delay on the order of nanoseconds between each laser segment. The optical polarizing element 16, such as a polarizer or waveplate, is positioned so as to respectively polarize the first, second, third, fourth, fifth, and sixth laser segments 22, 24, 26, 28, 30, and 32 with a 0° linear polarization, a 45° linear polarization, a 90° linear polarization, a 135° linear polarization, a right-handed, circular polarization (RHCP), and a left-handed, circular polarization (LHCP). The optical recombiner 18 is positioned to receive the polarized laser segments and configured to combine the polarized laser segments into a train of co-aligned pulses 34 for illuminating an object 36.

An optional receiver 38 can then be used to receive the reflected polarization 40, which can be used to classify the object 36. Traditional techniques for measuring an object's unique polarization signature involve individual measurements of reflected Stokes parameters for a given set of generated Stokes parameters illuminating the object. Typically, the four Stokes parameters, $S_i$ (i=0 to 3), are used to describe a state of polarization. These parameters can be determined from measurements made of the intensity of the light passing through horizontal, vertical, +45 degrees (diagonal) and −45 degrees (antidiagonal) linear polarizers, and right and left circular polarizers. Defining the normalized intensity values through the polarizers as h, v, d, a, r, and l respectively, the Stokes parameter can be described as $$S_0 = h + v \quad \text{(Eq. 1)}$$

$$S_1 = h - v \quad \text{(Eq. 2)}$$

$$S_2 = d - a \quad \text{(Eq. 3)}$$

$$S_3 = r - l \quad \text{(Eq. 4)}$$

The output Stokes parameters measured after the light passes through a medium or reflected from a surface or a combination of both is defined as $S_i'$ (i=0 to 3). The output parameters are a function of the initial Stokes parameters, $S_i$, and can be represented by a series of four equations with 16 coefficients.

The optical interrogator 10 may be used to rapidly interrogate the object 36 with the train of coaligned laser pulses 34 so that the optional receiver 38 can receive the reflected polarization 40 and the polarization characteristics of the object 36 may be determined quickly (i.e., on the order of nanoseconds). A suitable example of the optional receiver is a passive Stokes polarimeter. A minimum of four incident polarizations are required to calculate the Mueller matrix elements, but additional polarizations can reduce error. The train of coaligned laser pulses 34 may be described as a train of six pulses, where each pulse has a different polarization: four linear polarizations separated by 45 degrees each, and two circular polarizations (right and left handed).

Figure 2:
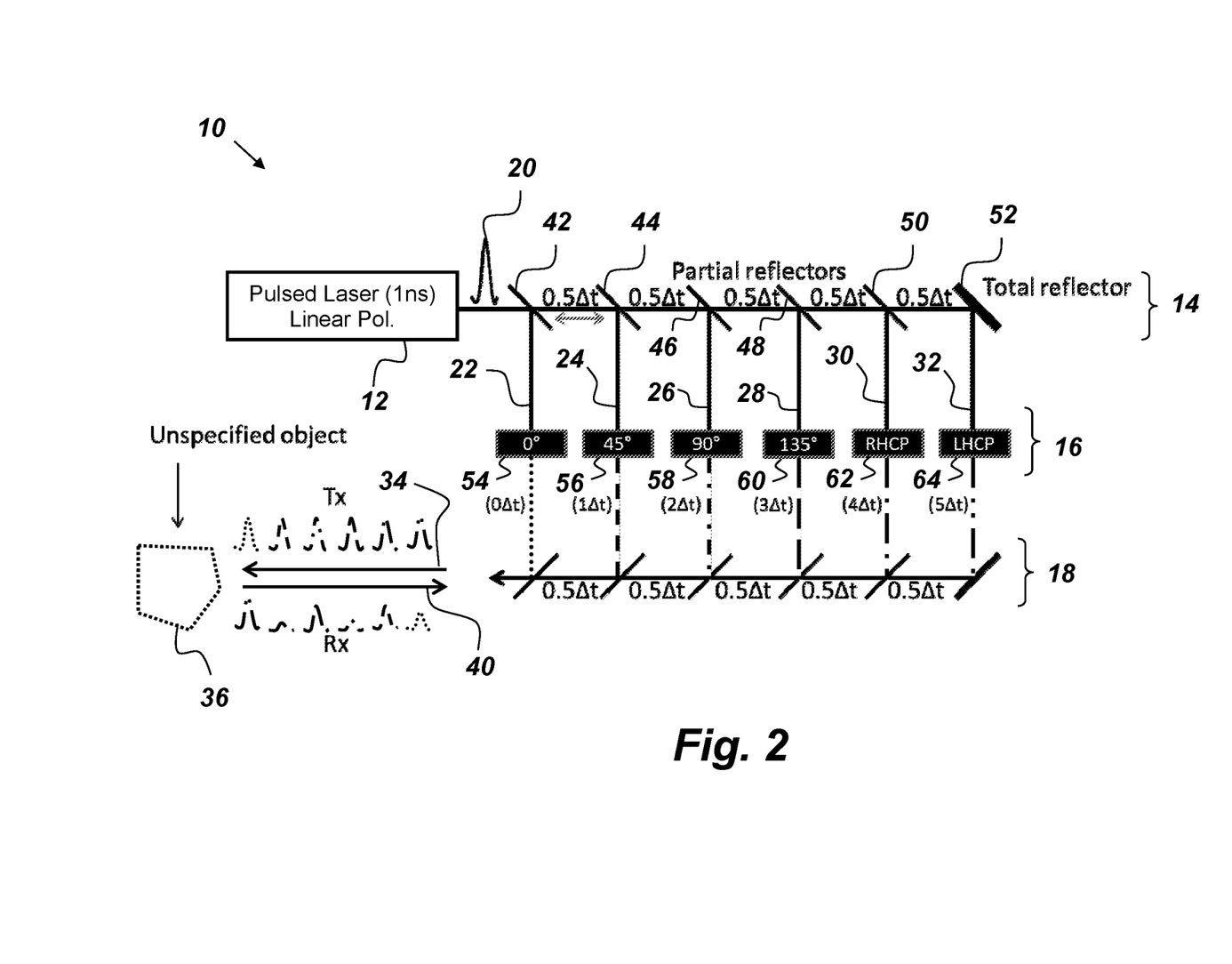
FIG. 2 is an illustration of an optical interrogator.

FIG. 2 is an illustration of an embodiment of the optical interrogator 10 using a free-space laser and free-space optics. In the embodiment of the optical interrogator 10 depicted in FIG. 2, the laser 12 is a pulsed laser that outputs light with very short pulse widths (e.g. 10 nanoseconds to 10 femtoseconds in duration). In this embodiment, the splitter 14 comprises first, second, third, fourth, and fifth partial reflectors 42, 44, 46, 48, and 50 respectively, and a first mirror 52. The laser pulse 12 hits the first partial reflector 42 where a fraction of the pulse energy (i.e., the $1^{st}$ laser segment 22) is reflected to a first polarizing element 46, while the remaining fraction of the pulse energy propagates through the first partial reflector 42 and hits the second partial reflector 42. The second partial reflector 44 reflects a fraction of the pulse energy (i.e., the $2^{nd}$ laser segment 24) which propagates through a second polarizing element 56, the remaining pulse energy propagates to the third partial reflector 46.

Still referring to FIG. 2, the third partial reflector 46 reflects a fraction of the pulse energy (i.e., the $3^{rd}$ laser segment 26) which propagates through a third polarizing element 58, the remaining pulse energy propagates to the fourth partial reflector 48. The fourth partial reflector 48 reflects a fraction of the pulse energy (i.e., the $4^{th}$ laser segment 28) which propagates through a fourth polarizing element 60, the remaining pulse energy propagates to the fifth partial reflector 50. The fifth partial reflector 50 reflects a fraction of the pulse energy (i.e., the $5^{th}$ laser segment 30) which propagates through a fifth polarizing element 62, the remaining pulse energy propagates to the first mirror 52. The first mirror 52 reflects the remaining pulse energy (i.e., the $6^{th}$ laser segment 32) which propagates through a sixth polarizing element 64. The time delay is implemented by additional propagation of the light between elements of the optical interrogator 10. Light propagates 1 foot in approximately $10^{-9}$ seconds. Once the pulses have passed through the polarizing elements 54, 56, 58, 60, 62, and 64, they will hit the optical recombiner 18, which in this embodiment comprises another set of partially reflective mirrors to combine the individual laser pulses into the co-aligned train of pulses 34. This train of pulses 34 will then be used to illuminate the object 36 to be characterized.

Figure 3:
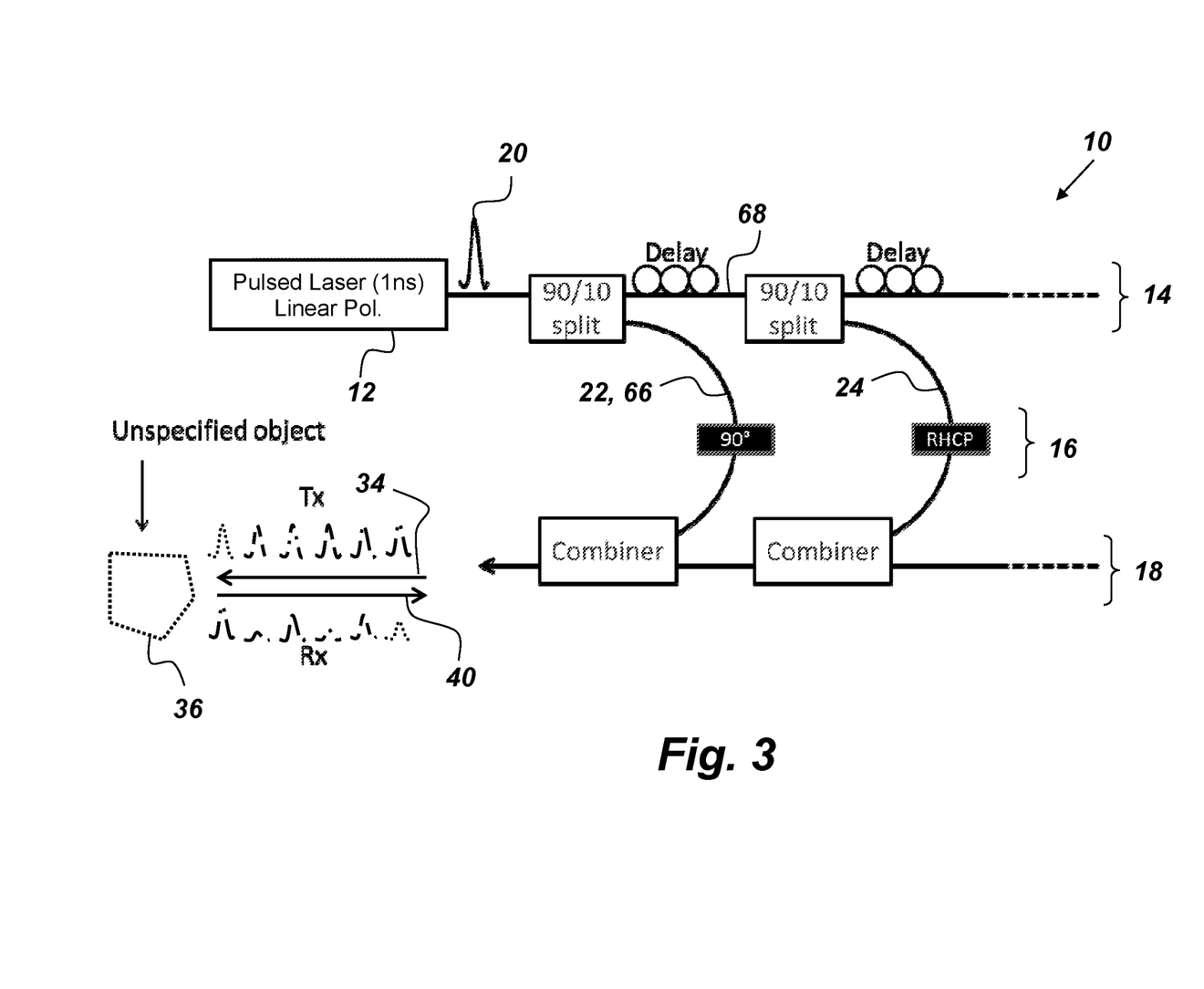
FIG. 3 is an illustration of an optical interrogator.

FIG. 3 is an illustration of an embodiment of the optical interrogator 10 comprising a fiber laser and fiber optic components. This embodiment of the optical interrogator 10 uses fully enclosed (non-free-space) fiber optic components instead of free-space lasers. In this embodiment, the laser 12 is a fiber laser that generates the initial laser pulse 20, which propagates through fiber optic cable until it reaches an embodiment of the splitter 14, which picks off a fraction of the pulse energy (i.e., the first laser segment 22) into a first fiber 66 and the remaining pulse energy into a second fiber 68 of known length to introduce a time delay to the pulse. In this embodiment, the first laser segment 22 is passed through a polarizing element 16 that is implemented in fiber optic cable as is known in the art. This process of splitting off a portion of the laser pulse 20 and imparting a polarization to the split-off portion continues for all six laser segments 22, 24, 26, 28, 30, and 32. After all pulses with different polarizations have been generated, the fibers go through the optical combiner 18, which is implemented in optical fiber, to create the train of coaligned laser pulses 34.

Figure 4:
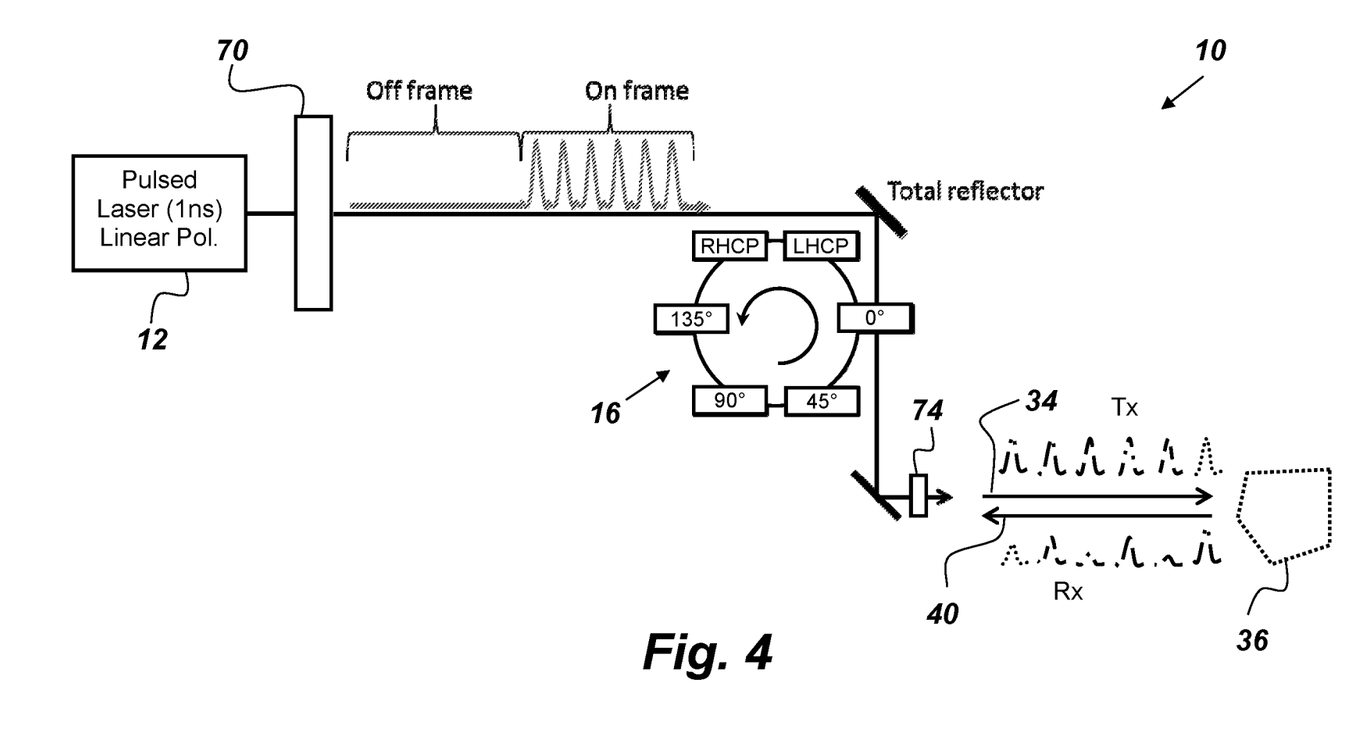
FIG. 4 is an illustration of an optical interrogator.

FIG. 4 is an illustration of an embodiment of the optical interrogator 10. In this embodiment, the laser 12 outputs a series of laser pulses 20 with very short pulse widths (e.g. 10 nanoseconds to 10 femtoseconds in duration). The laser pulses 20 then pass through a shutter or modulator 70 so that the laser 12 remains on but an integer number of laser pulses 20 (e.g., six) are emitted in an "on frame", each laser pulse 20 separated in time by a used-defined time difference (which depends on the specifications of the laser). Polarization is imparted to the pulses by the optical polarizing element 16, which in this embodiment, is a rotating series of solid-state, polarizing elements. A suitable example of the optical polarizing element 16 is an LCD-based electro-optical polarization controller. However, it is to be understood, that other polarization-controlling means may be used as the optical polarizing element 16. The optical interrogator 10 may be tuned to generate a number (e.g., six) of equal intensity pulses (or any profile desired). In this embodiment, the time difference Δt is implemented solely by pulse separation, which is controlled by the laser 12. The on and off frames are required so that the laser pulses 20 can be emitted from the optical interrogator 10 and then received by the receiver 38, avoiding interference with the next pulse train. For example, in one embodiment, the optical interrogator can remain 50% on during one polarization cycle (i.e., an "on frame"), and 50% off during the next polarization cycle (an "off frame" or zero-pulse frame).

Still referring to FIG. 4, the high-speed polarization cycle is synchronized with the laser pulses 20, and these polarized pulses are emitted from a system aperture 74. As an alternative implementation of this design, the laser 12 itself can be configured to modify the output polarization of the laser pulses 20 directly; Kerr cells, Pockels cells, and other modulators can be employed for this purpose. The train of laser pulses 34 may then be used to illuminate the object 36 under study. The received Stokes parameters from the reflected polarization 40 may be measured by the differential return intensity through polarizing elements of the receiver 38 (as a function of time), and may be used to calculate the Mueller matrix elements.

Figure 5:
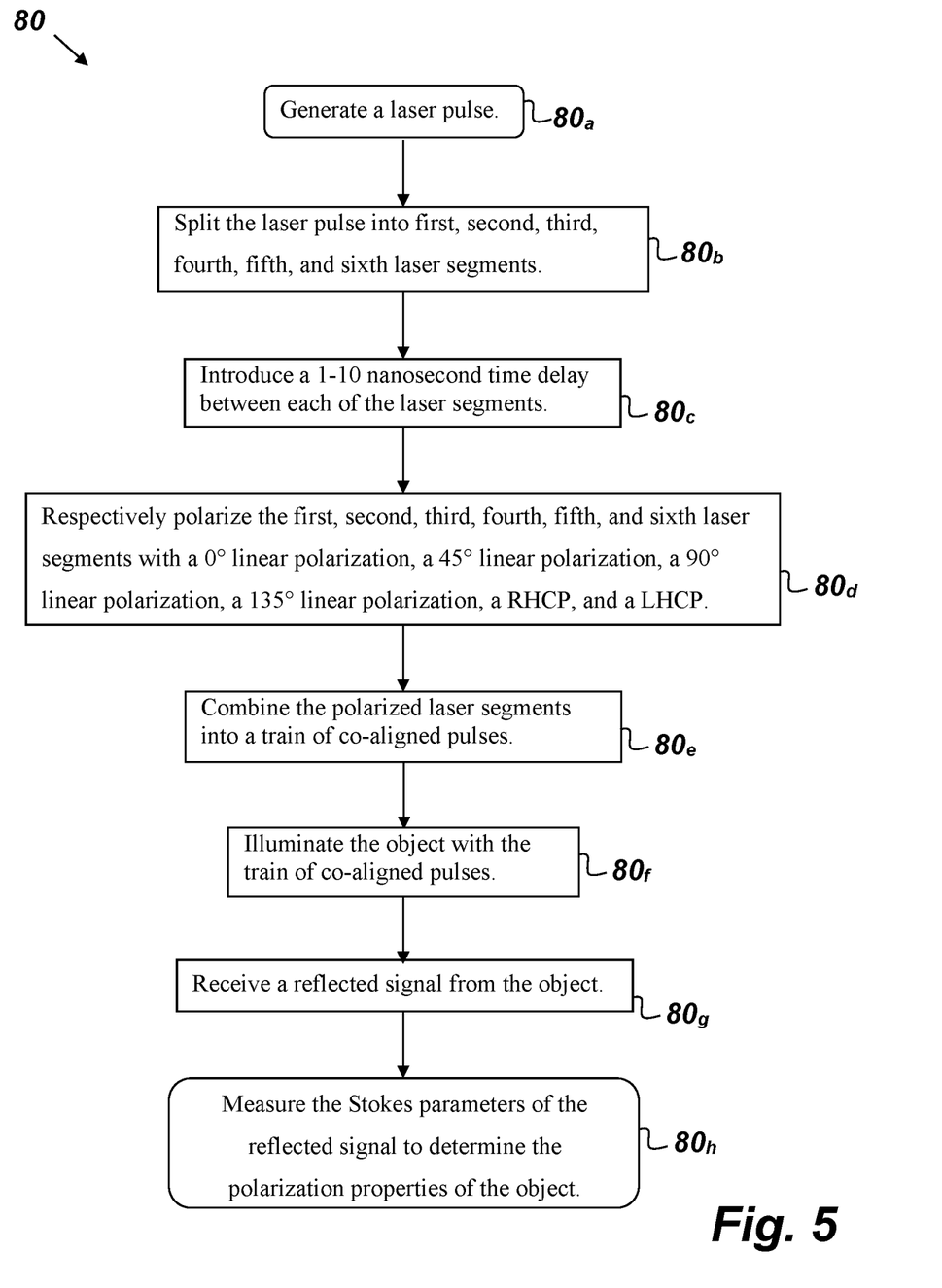
FIG. 5 is a flowchart.

FIG. 5 is a flowchart of a method 80 for measuring the polarization properties of an object comprising the following steps. The first step $80_a$ provides for generating a laser pulse. The next step $80_b$ provides for splitting the laser pulse into first, second, third, fourth, fifth, and sixth laser segments. The next step $80_c$ provides for introducing a 1-10 nanosecond time delay between each of the laser segments. The next step $80_d$ provides for respectively polarizing the first, second, third, fourth, fifth, and sixth laser segments with a 0° linear polarization, a 45° linear polarization, a 90° linear polarization, a 135° linear polarization, a RHCP, and a LHCP. The next step $80_e$ provides for combining the polarized laser segments into a train of co-aligned pulses. The next step $80_f$ provides for illuminating the object with the train of co-aligned pulses. The next step $80_g$ provides for receiving a reflected signal from the object. The next step $80_h$ provides for measuring the Stokes parameters of the reflected signal to determine the polarization properties of the object. The object may be a moving object. The step of determining the polarization properties of the object may be performed without comparison to a reference object having known polarization properties.

The method 80 greatly speeds up the time required to illuminate an object with different polarizations. The optical interrogator 10 and method 80 can be used to illuminate an object over a rapid time period of nanoseconds. Since the optical interrogator 10 and method 80 are capable of illuminating an object with multiple polarizations over several nanoseconds, objects that are moving may be sampled nearly instantaneously. That is, the movement of most objects is not occurring within the nanosecond timescale. This is also true for the medium in which the object is being sampled. For instance, the optical conditions of atmospheric and underwater media change on the order of milliseconds or slower, and thus appear "frozen in time" to the optical interrogator 10.

The optical interrogator 10 may be easily calibrated as the laser pulses 20 are generated from a single source, and the changes being detected are relative between pulses, as opposed to absolute of each pulse. Each pulse train 34 has a 0° polarized copy of the laser pulse 20; its energy may be used as a reference for the other polarized pulses. A single integrated splitter that has 1 input and 6 output channels can replace the sequential splitters, such as is depicted in FIG. 2. Different optical elements can be used to recombine free space beams (e.g., reflectors tuned to particular polarizations, total reflectors with pinhole apertures to transmit beams, etc.). Many different laser wavelengths can be of use and interest in conjunction with the optical interrogator 10. Other types of non-laser sources can be employed as the laser 12. Different pulse lengths—both shorter and longer—can be employed, depending on the application.

From the above description of the optical interrogator 10 and method 80, it is manifest that various techniques may be used for implementing the concepts of the optical interrogator 10 and method 80 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the optical interrogator 10 and method 80 is not limited to the particular embodiments described herein, but is capable of many embodiments without departing from the scope of the claims.

We claim:

1. An optical interrogator for illuminating an object comprising:
 a laser configured to generate a laser pulse;
 a splitter positioned so as to receive the laser pulse and configured to split the laser pulse into first, second, third, fourth, fifth, and sixth laser segments such that each of the laser segments are separated by a time delay on the order of nanoseconds between each laser segment;
 an optical polarizing element positioned so as to respectively polarize the first, second, third, fourth, fifth, and sixth laser segments with a 0° linear polarization, a 45° linear polarization, a 90° linear polarization, a 135° linear polarization, a right-handed, circular polarization (RHCP), and a left-handed, circular polarization (LHCP); and
 an optical recombiner positioned to receive the polarized laser segments and configured to combine the polarized laser segments into a train of co-aligned pulses for illuminating the object.

2. The optical interrogator of claim 1, wherein the optical polarizing element is a polarizer.

3. The optical interrogator of claim 1, wherein the optical polarizing element is a wave-plate.

4. The optical interrogator of claim 1, wherein the splitter comprises first, second, third, fourth, and fifth partial reflectors and a first mirror that are all equally-spaced with each other and optically-aligned with the laser such that the first partial reflector converts the laser pulse into the first laser segment and a first pass-through laser signal, the second partial reflector converts the first pass-through laser signal into the second laser segment and a second pass-through laser signal, the third partial reflector converts the second pass-through laser signal into the third laser segment and a third pass-through laser signal, the fourth partial reflector converts the third pass-through laser signal into the fourth laser segment and a fourth pass-through laser signal, the fifth partial reflector converts the fourth pass-through laser signal into the fifth laser segment and a fifth pass-through laser signal, and the first totally reflective mirror converts the fifth pass-through laser signal into the sixth laser segment.

5. The optical interrogator of claim 4, wherein the optical recombiner comprises sixth, seventh, eighth, ninth, and tenth partial reflectors and a second mirror that are all equally-spaced with respect to each other and positioned such that the second totally-reflective mirror reflects the LHCP laser segment, the sixth partial reflector combines the reflected LHCP laser segment and the RHCP laser segment into a first combined signal, the seventh partial reflector combines the first combined signal and the 135° laser segment into a second combined signal, the eighth partial reflector combines the second combined signal and the 90° laser segment into a third combined signal, the ninth partial reflector combines the third combined signal and the 45° laser segment into fourth combined signal, and the tenth partial reflector combines the fourth combined signal and the 0° laser segment into the train of co-aligned pulses.

6. The optical interrogator of claim 1, wherein the splitter, the polarizing optical element, and the optical recombiner are fiber-optic based such that no free-space lasers are used between the laser and the optical recombiner.

7. The optical interrogator of claim 6, wherein the splitter comprises first, second, third, fourth, and fifth 90/10 fiber optic splitters that are each separated by a length of fiber optic cable so as to impart a desired time delay between each of the first, second, third, fourth, fifth, and sixth laser segments.

8. The optical interrogator of claim 1, wherein the six laser segments are a series of laser pulses having a short pulse width of 10 nanoseconds to 10 femtoseconds generated by the laser, and wherein the splitter and optical recombiner are embodied in a modulator configured to allow six laser pulses to pass to the optical polarizing element during an "on" frame and to block six laser pulses during an "off" frame.

9. The optical interrogator of claim 8, wherein the optical polarizing element is a liquid-crystal-display (LCD)-based electro-optical polarization controller that imparts a separate polarization to each of the six laser pulses.

10. A method for measuring the polarization properties of an object comprising the following steps:
   generating a laser pulse;
   splitting the laser pulse into first, second, third, fourth, fifth, and sixth laser segments;
   introducing a 1-10 nanosecond time delay between each of the laser segments;
   respectively polarizing the first, second, third, fourth, fifth, and sixth laser segments with a 0° linear polarization, a 45° linear polarization, a 90° linear polarization, a 135° linear polarization, a right-handed, circular polarization (RHCP), and a left-handed, circular polarization (LHCP)
   combining the polarized laser segments into a train of co-aligned pulses;
   illuminating the object with the train of co-aligned pulses;
   receiving a reflected signal from the object; and
   measuring the Stokes parameters of the reflected signal to determine the polarization properties of the object.

11. The method of claim 10, wherein the object is a moving object.

12. The method of claim 10, wherein the determining of the polarization properties of the object is performed without comparison to a reference object having known polarization properties.

13. The method of claim 10, wherein the splitting step comprises:
   using a first partial reflector to convert the laser pulse into the first laser segment and a first pass-through laser signal;
   using a second partial reflector to convert the first pass-through laser signal into the second laser segment and a second pass-through laser signal;
   using a third partial reflector to convert the second pass-through laser signal into the third laser segment and a third pass-through laser signal;
   using a fourth partial reflector to convert the third pass-through laser signal into the fourth laser segment and a fourth pass-through laser signal;
   using a fifth partial reflector to convert the fourth pass-through laser signal into the fifth laser segment and a fifth pass-through laser signal;
   and using a first totally reflective mirror to convert the fifth pass-through laser signal into the sixth laser segment.

14. The method of claim 13, wherein the combining step comprises:

reflecting the LHCP laser segment with a second totally-reflective mirror;
   combining the reflected LHCP laser segment and the RHCP laser segment into a first combined signal with a sixth partial reflector;
   combining the first combined signal and the 135° laser segment into a second combined signal with a seventh partial reflector;
   combining the second combined signal and the 90° laser segment into a third combined signal with an eighth partial reflector;
   combining the third combined signal and the 45° laser segment into fourth combined signal with a ninth partial reflector; and
   combining the fourth combined signal and the 0° laser segment into the train of co-aligned pulses with a tenth partial reflector.

15. The method of claim 10, wherein the splitting, polarizing, and combining steps are performed with fiber-optic components such that no free-space lasers are used between the steps of generating the laser pulse and the step of combining the polarized laser segments.

16. The method of claim 15, wherein the splitting step uses first, second, third, fourth, and fifth 90/10 fiber optic splitters that are each separated by a length of fiber optic cable to impart a desired time delay between each of the first, second, third, fourth, fifth, and sixth laser segments.

17. The method of claim 10, wherein the splitting step is performed by generating with the laser a series of laser pulses having a short pulse width of 10 nanoseconds to 10 femtoseconds, and the splitting step further comprises using a modulator to allow six laser pulses to be polarized during an "on" frame and to block six laser pulses during an "off" frame.

18. The method of claim 17, wherein the polarizing step is performed with a liquid-crystal-display (LCD)-based electro-optical polarization controller that imparts a separate polarization to each of the six laser pulses.

19. A method for measuring the polarization properties of an object comprising the following steps:
   generating a series of laser pulses having a pulse wide of 10 nanoseconds to 10 femtoseconds;
   creating a train of six laser pulses with a modulator that allow six laser pulses to pass during an "on" frame and blocks six laser pulses during an "off" frame;
   polarizing each of the six laser pulses with a separate orientation selected from the group consisting of a 0° linear polarization, a 45° linear polarization, a 90° linear polarization, a 135° linear polarization, a right-handed, circular polarization (RHCP), and a left-handed, circular polarization (LHCP);
   illuminating the object with the train of polarized pulses;
   receiving a reflected signal from the object; and
   measuring the Stokes parameters of the reflected signal to determine polarization properties of the object.

20. The method of claim 19, wherein the polarization step is performed with a liquid-crystal-display (LCD)-based electro-optical polarization controller that imparts a separate polarization to each of the six laser pulses.

* * * * *